Feb. 27, 1934.    J. BOGOPOLSKY    1,948,900
APPARATUS FOR CINEMATOGRAPHIC PROJECTION
Filed June 26, 1931

Inventor:
Jacques Bogopolsky
By: B. Singer, Atty.

Patented Feb. 27, 1934

1,948,900

UNITED STATES PATENT OFFICE 1,948,900

APPARATUS FOR CINEMATOGRAPHIC PROJECTION

Jacques Bogopolsky, Geneve-Acacias, Switzerland

Application June 26, 1931, Serial No. 547,093
In France June 26, 1930

1 Claim. (Cl. 88—18.4)

The present invention relates to an improvement particularly adapted to the arrangement to permit of the projection of different films for example a wide film with two marginal perforations and one, narrower with a central perforation, both films having, or not the same pitch.

The characteristic of the invention resides in the fact that the driving means comprises at least one or two long marginal claws working in a plane and at least one shorter central claw working in another plane, all the claws being capable of simultaneously engaging in corresponding openings in a guide passage of the film consisting of two paths of different widths situated in two different planes respectively corresponding to those of the claws, passages in which fit the resilient and removable pressure shutter or shutters appropriate in shape to the film used.

The improvement also refers necessarily to at least one toothed sprocket which is removable and interchangeable according to the nature of the film used.

In the accompanying drawing given by way of example, is shown a constructional form of the apparatus and in this drawing.

Figures 4, 5:
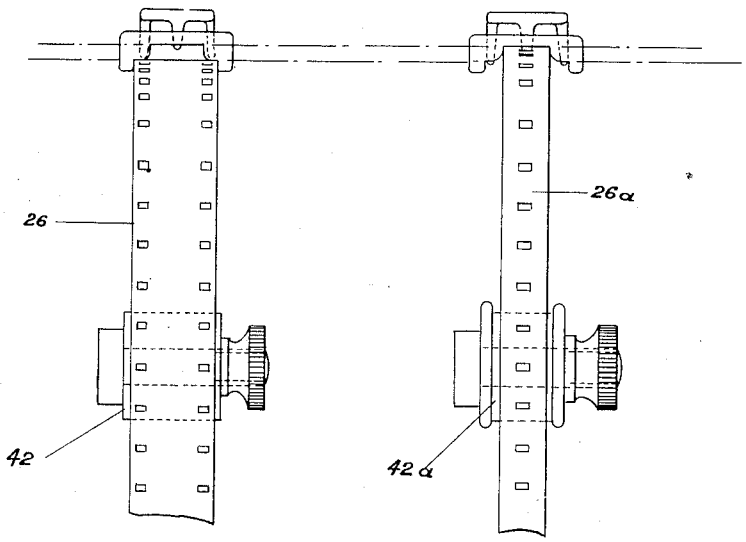

Figs. 4 and 5 each show a plan view of two films of different widths, as well as the necessary driving parts.

Figure 1:
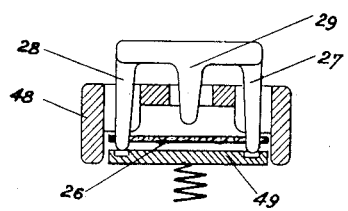
Fig. 1 is a cross section of the guiding member, the carrying member for the film, having claws, being seen in underneath view, this figure showing the application of a wide film.
Figure 2:
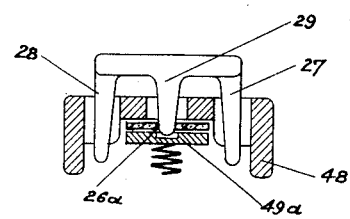
Fig. 2 is a similar view but showing the application of a narrow film.

Figs. 1 and 2 show the section through the channel of the film, the film itself and the claw parts serving to drive it. The channel consists of a stationary passage 48 and a removable presser member 49 pressing the film 26 against the passage. The claw carries a central tooth 29 and two marginal teeth 27 and 28. The film 26 being wider and carrying marginal perforations, only the teeth 27 and 28 serve to drive it. The tooth 29 being shorter does not reach the film.

In Fig. 2 the film 26a is narrower and fits in the bottom of the passage 48 against which it is pressed by the resilient presser member 49a. In this second case, it is the central tooth 29 which drives the film and the marginal teeth 27 and 28 pass outside without reaching it. It will be seen that in this second case, the film 26a is in a different plane to the preceding 26.

Figure 3:
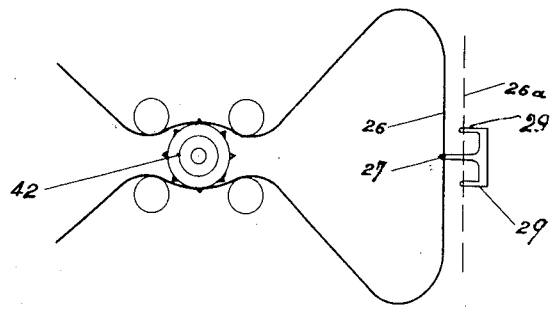
Fig. 3 shows a diagram of the general arrangement of the parts.

Fig. 3 shows the respective position of the two films. The marginal tooth 27 engages the film 26 and in the case of the projection of a narrow film 26a it is the central tooth 29 which alone acts. The figure represents two teeth 29 so as to improve the movement of the film.

Figs. 4 and 5 show a view in elevation of the driving arrangement comprising the passage, the claw and the sprocket. The respective planes of the two films are clearly distinct at the passage through the slide. The sprocket 42 can be replaced by another 42a in the case where a narrow film 26a is used. A pulley keeps both sprockets in place on the axis.

It is clear that the apparatus could be further modified to permit of more than two films being used.

I claim:

In apparatus for cinematographic projection, a film gate element having a pair of channels for the reception and passage of films one deeper and of less width than the other, and a longitudinal slot in the bottom of the deeper channel and a longitudinal slot at one side of the wider channel; a claw member having a relatively long claw at one side arranged to operate in the side slot and a relatively short claw arranged to operate in the slot in the bottom of the deeper channel, and interchangeable presser members each adapted for arrangement in only one of the channels for pressing the film in such channel against the bottom thereof, each of said presser members having yieldable pressing means.

JACQUES BOGOPOLSKY.